United States Patent [19]

Netwig et al.

[11] Patent Number: 5,250,118
[45] Date of Patent: Oct. 5, 1993

[54] METHOD OF REMOVING FOULANTS AND RESTORING PRODUCTION OF SPINAL-WOUND REVERSE OSMOSIS CARTRIDGES

[76] Inventors: Craig L. Netwig, 947 Intrepid Ct., Del Mar, Calif. 92014; David L. Kronmiller, 1717 N. Elm, Escondido, Calif. 92026

[21] Appl. No.: 886,840

[22] Filed: May 22, 1992

[51] Int. Cl.⁵ .................. B08B 9/02; B01D 65/02
[52] U.S. Cl. .................. 134/22.1; 210/321.61; 210/321.74; 210/321.83; 210/321.69; 210/106; 210/500.21; 210/636
[58] Field of Search .............. 210/321.61, 321.74, 210/321.83, 106, 500.21, 636; 264/DIG. 48; 134/22.1

[56] References Cited

U.S. PATENT DOCUMENTS 4,740,308  4/1988  Fremont et al. .............. 210/636

OTHER PUBLICATIONS

"Reverse Osmosis Membrane Regeneration", Office of Saline Water R&D report pp. 1, 2, 34–37, 54–59.

Primary Examiner—Theodore Morris
Assistant Examiner—Thomas G. Dunn, Jr.
Attorney, Agent, or Firm—John J. Murphey

[57] ABSTRACT

A method of removing foulants from spiral-wound reverse osmosis cartridges, comprising the steps of:

a) freeing the envelopes and webbing from their original confinement;

b) soaking the envelopes and webbing in a cleaning solution, specific to the general chemical nature of the foulants found in the webbing and on the surface of the envelopes, for a period of time sufficient to dissolve solubilize soften, and loosen the foulants;

c) unwrapping and washing each membrane envelope and layer of webbing to physically remove the foulants therefrom;

d) rewinding the membrane envelopes and layers of webbing in spiral configuration about the center product tube while simultaneously drawing a vacuum on the product tube to remove air trapped in the envelopes and enable the memory of the envelopes and webbing to urge themselves into their original tightly-wrapped configuration thereabout; and, e) reconfining the ends of the wrapped layers and resealing the outer surface and one end of the reassembled cartridge against leakage.

15 Claims, No Drawings

METHOD OF REMOVING FOULANTS AND RESTORING PRODUCTION OF SPINAL-WOUND REVERSE OSMOSIS CARTRIDGES

BACKGROUND OF THE INVENTION

1. Field of the Invention

This invention pertains to the field of reverse osmosis and ultra filtration. More particularly, the invention concerns a method of removing foulants from a used spiral-wound cartridge to bring it back to original production or near original production levels.

2. Description of the Prior Art

In the field of water filtration, most commercial processes involve the use of spiral-wound reverse osmosis cartridges. These cartridges are used either singly or in groups. The feed-water stream to the cartridge is either referred to as "feed-water" or as "brine" while the filtered water produced from the cartridge is called the "permeate" stream.

The cartridge is commonly constructed of one or more generally rectangular envelopes made of opposed sheets of a proprietary plastic film, sealed about three sides, that passes water molecules there across without passing other larger molecules, held apart by an interior layer of polysulfone and whose non-sealed edges are separately attached to the sides of an elongated slit formed in the wall of a centralized product tube. The envelope or envelopes are thereafter spiral-wound about the center product tube along with a layer or layers of an open web or screen called "brine channel webbing", to maintain the outer surfaces of a particular envelope free from direct contact with an overlying or underlying layer of membrane envelope, to a tight cylinder about the center product tube. Each end of the spiral wound cylindrical cartridge is capped with an element called an "anti-telescoping" device that keeps the spiral-wound layers from shifting lengthwise along the center product tube. Over top of the wound layers is placed either a shrink-wrap plastic in overlapping layers that is thereafter subject to heat or other shrink operation to form a tight, waterproof coating or is overcoated with a gel coat of curable, hardenable plastic either with or without a layer or layers of woven or non-woven fiberglass or other strengthening material.

In use, one end of the spiral-wound cartridge is capped to prevent water from exiting the layer of webbing, and the other end is connected to a source of feed water. The pressure of the feedwater is raised to approximately 200 pounds per square inch and by reverse osmotic pressure, the feed or brine water enters into the layer taken up by the brine channel webbing between the rolled envelopes of reverse osmosis material to force the water into the center of the envelopes where it moves by migration and pressure along the layer of polysulfone to enter through the slits into the center product tube and exit the cartridge as clear, fresh water. These cartridges range in size from as small as one inch to upwards of eight inches in diameter and in lengths of from less than two feet to over four feet in length. While in some cases, a single cartridge may be used, more often two or more cartridges are arranged in parallel to increase the permeate water output.

A significant problem has existed with the use of spiral-wound reverse osmosis cartridges namely that after an extended period of use, output rates of the permeate stream begin to subside and, if not treated, the cartridge will soon be rendered unusable. The reason for the decrease in output is because of the accretion of foulants brought in with the feed-water stream that enter the brine webbing, clog the webbing and coat the surfaces of the membrane envelopes.

There are generally three types of foulants; a carbonate based foulant such as calcium carbonate, a sulfate foulant such as calcium or aluminum sulfate, and sylicates such as aluminum and calcium silicates which precipitate from the feed-water. Past practices at removing these foulants are limited to flushing water-based cleaning solutions through the feed-water stream that soften or dissolve some of these foulants with respect to sylicates, their removal by this flushing practice has proven inadequate as they do not easily become solubilized. Another solution showing limited success is to add certain chemicals to the feed-water stream to keep the foulants in solution or suspension. This treatment has come under some criticism because the discharged feed-water stream, carrying these added chemicals, is passed into public sewage treatment plants and their presence sometimes interferes with sewage treatment or runs afoul of certain environmental regulations and statutes.

Some attempt has been made to remove the outer covering and anti-telescoping devices from the ends of the cartridge, unwrapping the cartridge and physically cleaning the individual membrane envelopes, however, no success has been achieved with rewrapping the envelopes and webbing into the tightly spiral-wound configuration as they were originally configured. Attempts to squeeze the wrapped envelopes and webbing into a tighter configuration has proved unsuccessful because the webbing tears the reverse osmosis membrane apart, thereafter allowing feed-water to pass directly into the permeate water stream. Modern treatment, therefore, has been to make one or two attempts to clean the cartridges using a chemical flush and, when that process proves to be ineffective, discard the cartridges and replace them with new cartridges. The cost of replacement cartridges, depending upon the size and use thereof, may be and often is a significant cost of operation that raises the volumetric price of the permeate stream.

SUMMARY OF THE INVENTION

This invention is a method of removing foulants from spiral-wound reverse osmosis cartridges and restoring them to original or near original flow rates and salt rejection. By this invention, the cartridges may be continuously maintained and used over an extended period of time, thereby significantly reducing the need to discard them and replace them with new ones. The cartridges treated by this novel method are unwound, cleaned, repaired where necessary, and rewound to original or near original dimensions so that the treated cartridge emerges from the method in the same size and shape as the original cartridge and with an output equal to and in some oases better than the original output specifications for a new cartridge and certainly not significantly less than the cartridge delivered in the as-new condition.

The invention utilizes the "memory" characteristics of the reverse osmosis polymer, polysulfone envelope interior spacer and brine channel webbing to reconfigure the elements into the same position and relationship they took with the original spiral-winding when assembled. While memory of a plastic has been utilized in the past, in this particular technology, the memory of the individual plastic materials making up the cartridge have not been recognized as a powerful influence, or useful in re-configuring the spiral-winding of the membrane envelopes, spacer, and brine channel webbing. This memory is called into action by the use of a vacuum drawn on the center product tube while the membrane envelopes and brine channel webbing are re-wrapped about the center product tube following cleaning. The end result is a virtual reconstitution of the spiral-wound reverse osmosis cartridge into its original configuration along with its original or near original flow rates and salt separation rates.

Accordingly, the main object of this invention is a method of removing foulants from the surfaces of the membrane envelopes of a spiral-wound reverse osmosis cartridge. Other objects of the invention include a method of restoring a spiral-wound reverse osmosis cartridge to its original or near original configuration and salt separation characteristics; a method of removing foulants from all of the reverse osmosis membrane surfaces; a method of fully cleaning the reverse osmosis membranes of all foulants including solubilizable and unsolubilizable material; a method of cleaning the membrane envelopes of a reverse osmosis cartridge wherein defects or damage to the membrane may be repaired while the envelopes are unwound from the central process tube; a method of rewinding an unwound reverse osmosis cartridge utilizing the memory characteristics of the individual plastic materials making up the components of the cartridge to original or near original specifications of size and length; and a method whereby spiral-wound reverse osmosis cartridges may be given an extended life through a new method of cleaning foulants therefrom.

These and other objects of the invention may be obtained by reading the following description of the preferred embodiment. The protection sought by the inventor may be gleaned from a fair reading of the claims that include this specification.

DESCRIPTION OF THE PREFERRED EMBODIMENT

The method of this invention comprises the steps of freeing the membrane envelopes and accompanying webbing from their original confinement, soaking the envelopes and webbing in a cleaning solution specific to the general chemical nature of the foulants found in the webbing and on the surfaces of the envelopes for a period of time sufficient to soften them, unwrapping and washing each membrane envelope and layer of webbing to physically remove the foulants therefrom, rewinding the membrane envelopes and layers of webbing in spiral configuration about the center product tube while simultaneously drawing a vacuum on the product tube to enable the memory of the envelopes and webbing to urge themselves into their original tightly-wrapped configuration thereabout, and reconfining the ends of the wrapped layers and sealing the outer surface of the cartridge against leakage.

Generally speaking, each cartridge is bounded at its spaced-apart terminal ends by anti-telescoping devices and along the outside of the cylindrical surface of the cylinder by either a shrink-wrapped coating of plastic film or a thicker layer of a curable gel coat either alone or in combination with one or more layers of woven or non-woven fiber such as glass fibers. In the step of freeing the envelopes and webbing from their original confinement, the shrink-wrapped tape is either unwound from the cylindrical surface or a knife is used to cut away the gel coat and reinforcement therefrom. The anti-telescoping devices resemble round disks having a central aperture or ring, for fitting over the center product tube and spokes extending outward radially therefrom to a circumferential perimeter having a concave underside edge designed to fit over the outer edges of the wrapped envelopes. Once the shrink-wrapped tape or gel coat has been removed from the outer cylindrical surface of the cartridge the anti-telescoping devices are easily removed from the ends thereof. Care must be taken in cutting away the gel coat to insure that the knife blade does not penetrate into the wrapped envelopes as that would create a pathway for the brine water to short circuit into the product tube and destroy the purification aspect of the cartridge.

Upon freeing the envelopes and webbings from their original confinement, they tend to unwind slightly about the center product tube and become loosened. The envelopes, webbing, and center product tube are all then submerged into a tank of cleaning solution to dissolve, solubilize, soften, and/or loosen the foulants that have caked or otherwise precipitated on the surface of the osmotic membrane envelopes and in the openings of the brine web. The cleaning solution is generally formulated to the specific chemical nature of the foulants found in the cartridge. The chemical nature of the foulants may be determined by general chemical analysis, by investigation into the chemical nature of the feed water stream in which the reverse osmosis cartridges are used, and, where necessary, by the use of a microscope or other such instrument. The foulants may be organic or inorganic in nature and often are a mixture of both organic or inorganic materials.

It is already known in the reverse osmosis art that certain water solutions of alkaline or acid materials will dissolve, soften, solubilize, or loosen the inorganic and organic materials from the surface of the membrane envelopes and from the brine webbing. It has been found convenient to cause the cleaning solution to be moved about the cartridge such as by stirring or, most desirably, by recirculating the cleaning solution in the tank. This continuous motion of the cleaning solution appears to reduce the time needed to dissolve, soften, solubilize, or loosen the foulants from the envelopes and webbing. In most cases, the soaking step may be accomplished within eight hours. However, with larger cartridges, the soaking time may be increased proportionately.

The next step is to completely unwrap the individual membrane envelopes and layers of webbing and wash them to remove the foulants therefrom. Preferably, the individual membrane envelopes and layers of webbing are unwrapped and temporarily supported on a flat surface, such as a horizontal table surface, seriatim and thereafter a pressurized spray of water, preferably hot water, is sprayed on the surfaces thereof to remove the foulants therefrom. In addition, at this time the individual membrane envelopes may be closely examined to determine whether they contain any rips, splits, or tears that would serve as a short circuit for the brine water to enter the permeate stream, and repair these defects by gluing or otherwise fixing thereover a patch of membrane material such as is already known in the art.

Next, the cleaned membrane envelopes and layers of webbing are rewound in spiral configuration about the center product tube while simultaneously a vacuum is drawn on the product tube. Surprisingly, when this occurs, the memory of the individual membrane envelopes and layers of webbing aid in pulling the spiral wrapped layers back into their originally tightly-wrapped configuration thereabout. Without the step of utilizing a vacuum on the product tube, rewinding of the envelopes and webbing cannot be done such that the original size of the cylindrical wrap is again achieved. Further, to try to squeeze the envelopes and webbing into a still tighter wrap without drawing a vacuum on the product tube causes rips and tears in the membrane envelope that totally destroy the value of the reverse osmosis cartridge.

It is preferred to place the center product tube in a device that causes it to slowly rotate in the direction opposite to that of the wrapping while simultaneously drawing a vacuum on the interior thereof. This step of rotating the product tube enhances the wrapping of the envelopes and webbing into their tightly packed original configuration. The vacuum in the center product tube withdraws air that has been trapped in the membrane envelopes during the soaking and washing steps, and triggers the memory of these plastic products such that they will return to their original, tightly packed spiral wrapped configuration.

Thereafter, the ends of the wrapped layers are reconfined with anti-telescoping devices and the outer cylindrical surface of the cartridge is once again resealed against leakage. It is preferred at this point to inspect the ends of the cylindrically wrapped membrane envelopes and brine webbing to determine whether or not the free ends mate perfectly across the entire wrap. If they do not, such as in the case where the webbing may have been skewed during the rewrapping step and one or more strands of the webbing extend above the surface of the free ends, an additional step of trimming the wrapped ends of the rewound envelopes and webbing to a plane perpendicular or normal to the major axis of the center product tube is performed. The sealing of the membrane envelopes about their three edges is approximately 1" to 1-½" in width thus it is not detrimental to the integrity of the reverse osmosis cartridge to have a short distance of that sealed width removed to trim the ends of the rewrapped cartridge.

Following replacement of the anti-telescopic devices on the ends of the wrapped envelopes and webbing, the outer surface of the cylinder cartridge is either wrapped with a layer of shrinkable plastic tape in overlapped fashion and thereafter subjected to a tape shrinking operation, such as the application of heat, or the outer surface is coated with one or more layers of fiberglass and a hardenable gel coat, such as an epoxy resin, to harden into a covering.

Example No. 1

A small commercially available semi-permeable membrane cartridge of 2-½" in diameter by 21" in length was used to purify brackish water. The purified product initially was 250 gallons per day and 96% salt rejection. After several months' service, the product rate dropped to 170 gallons per day while maintaining 96% salt rejection. This cartridge was processed by the unique method of this invention and restored to a production level of 270 gallons per day with a 96% salt rejection.

Example No. 2

A spiral-wound cartridge, Filmtec BW 30-8040, was used in purification of the city water supply for boiler use. The purified water production initially was at 96% salt rejection and a production rate of 7,500 gallons per day. After 12 months of service, the salt rejection was still 96% but the production fell off to 3,500 gallons per day. After processing by the unique method of this invention, the cartridge once again produced 7,500 gallons per day with a 96% salt rejection rate.

Example No. 3

A 4" diameter commercially available reverse osmosis cartridge, (Filmtec BW 4040) used in purification of surface water produced an initial rate of 1,800 gallons per day and 96% salt rejection. After eight months of service, the production rate dropped to 1,200 gallons per day and the salt rejection decreased to 94%. After processing this membrane by the method of this invention, the cartridge once again produced 1,800 gallons per day of product at 96% salt rejection.

Example No. 4

A spiral-wound cartridge of Filmtec SW 30-4040, used in purification of sea water, was operated at 1,500 gallons per day and 98% salt rejection. After several months of service, the production rate dropped off to 800 gallons per day and 97% salt rejection. After processing by the unique method of this invention, the cartridge once again produced 1,500 gallons per day at 98% salt rejection.

What is claimed is:

1. A method of removing foulants from spiral-wound reverse osmosis cartridges, containing a plurality of semipermeable osmotic membrane envelopes attached to slit openings formed in a center product tube and tightly spiral wrapped thereabout with alternate layers of brine channel webbing, and confined at each end by an anti-telescoping device and sealed about the outer surface and at one end against leakage therefrom, comprising the steps of:
   a) freeing the envelopes and webbing from their original confinement;
   b) soaking the envelopes and webbing in a cleaning solution, specific to the general chemical nature of the foulants found in the webbing and on the surface of the envelopes, for a period of time sufficient to dissolve, solubilize, soften, and loosen the foulants;
   c) unwrapping and washing each membrane envelope and layer of webbing to physically remove the foulants therefrom;
   d) rewinding the membrane envelopes and layers of webbing in spiral configuration about the center product tube while simultaneously drawing a vacuum on the product tube to remove air trapped in the envelopes and enable the memory of the envelopes and webbing to urge themselves into their original tightly-wrapped configuration thereabout; and,
   e) reconfining the ends of the wrapped layers and resealing the outer surface and one end of the reassembled cartridge against leakage.

2. The method of claim 1 wherein the step of freeing the envelopes and webbing from their original confinement includes the steps of removing the seal from the outer surface of the wrapped layers and removing the anti-telescoping devices from the ends of the cartridge.

3. The method of claim 2 wherein the step of removing the seal from the outer surface of the wrapped layers includes the step of unwinding the seal.

4. The method of claim 2 wherein the step of removing the seal from the outer surface of the wrapped layers includes the step of cutting away the seal.

5. The method of claim 1 wherein the step of soaking the membranes and webbing in a cleaning solution includes the step of placing the membranes and webbing in a tank containing the solution and the additional step of moving the solution about the envelopes and webbing to enhance the cleaning action thereof.

6. The method of claim 1 wherein the step of soaking the envelopes and webbing in a cleaning solution includes the step of placing the envelopes and webbing in a tank containing the solution and the additional step of stirring the cleaning solution in the tank to enhance the cleaning action thereof.

7. The method of claim 1 wherein the period of time the envelopes and webbing are soaked in the cleaning solution is no longer than eight (8) hours.

8. The method of claim 1 wherein the step of unwrapping and washing each membrane envelope and layer of webbing includes the steps of temporarily supporting the envelopes and webbing seriatim on a surface and thereafter washing each of them with a pressured spray of water to remove the foulants therefrom.

9. The method of claim 8 wherein the water used in the spray is hot water.

10. The method of claim 1 including the additional step of repairing any rips or breaks in the membrane envelope following the step of washing each envelope to remove the foulants therefrom.

11. The method of claim 1 wherein the step of rewinding the membrane envelopes and layers of webbing in spiral configuration about the center product tube while simultaneously drawing a vacuum on the product tube includes the step of rotating the product tube to enhance the wrapping of the envelopes and webbing into their original configuration.

12. The method of claim 1 including the additional step of trimming the wrapped ends of the rewound envelopes and webbing on a plane normal to the major axis of the center product tube.

13. The method of claim 1 wherein the step of reconfining the ends of the wrapped layers and resealing the outer surface and one end against leakage includes the step of replacing the anti-telescoping devices at each end of the wound envelopes and webbing.

14. The method of claim 1 wherein the step of reconfining the ends of the wrapped layers and resealing the outer surface and one end against leakage includes the step of applying a layer of shrinkable plastic tape in overlap fashion about the outer surface of the wrapped envelopes and webbing and thereafter subjecting the tape to a shrink operation.

15. The method of claim 1 wherein the step of reconfining the ends of the wrapped layers and resealing the outer surface and one end against leakage includes the step of applying a layer of a hardenable gel coat about the outer surface of the wrapped envelopes and webbing.

* * * * *